(12) United States Patent  
Rasmussen et al.

(10) Patent No.: US 7,613,366 B2  
(45) Date of Patent: Nov. 3, 2009

(54) POLARIZATION MODE DISPERSION COMPENSATOR AND POLARIZATION MODE DISPERSION COMPENSATING METHOD

(75) Inventors: Jens C. Rasmussen, Kawasaki (JP); Akihiko Isomura, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/581,853

(22) PCT Filed: Mar. 25, 2004

(86) PCT No.: PCT/JP2004/004177

§ 371 (c)(1),  
(2), (4) Date: Jun. 5, 2006

(87) PCT Pub. No.: WO2005/093975

PCT Pub. Date: Oct. 6, 2005

(65) Prior Publication Data

US 2007/0110451 A1    May 17, 2007

(51) Int. Cl.  
*G02F 1/01* (2006.01)  
*H04B 10/13* (2006.01)  
*G02B 6/00* (2006.01)

(52) U.S. Cl. .............................. 385/2; 385/11; 398/147; 398/159; 359/246

(58) Field of Classification Search ...................... 385/2, 385/11; 398/147, 159; 359/246  
See application file for complete search history.

(56) References Cited

U.S. PATENT DOCUMENTS

| | | |
|---|---|---|
| 6,339,489 B1 | 1/2002 | Bruyere et al. |
| 2003/0081292 A1 | 5/2003 | Mikami et al. |
| 2003/0086144 A1 | 5/2003 | Chou et al. |
| 2003/0095313 A1 | 5/2003 | Menikoff et al. |

FOREIGN PATENT DOCUMENTS

| | | |
|---|---|---|
| EP | 1 170 890 A1 | 1/2002 |
| JP | 2000-507430 | 6/2000 |
| JP | 2001-044937 | 2/2001 |
| JP | 2001-230728 | 8/2001 |
| JP | 2002-082311 | 3/2002 |
| JP | 2005-502265 | 1/2005 |
| JP | 2005-502266 | 1/2005 |
| JP | 2006-527386 | 11/2006 |
| WO | 03/021821 A1 | 3/2003 |
| WO | 03/021822 A1 | 3/2003 |
| WO | 03/050984 A1 | 6/2003 |
| WO | 03/050985 A1 | 6/2003 |
| WO | 2005/006603 A1 | 1/2005 |

OTHER PUBLICATIONS

"Automatic Compensation of Polarization-Mode Dispersion for 40Gb/s Transmission Systems", Journal of Lightwave Technology, vol. 20. No. 12, pp. 2101-2109, 2002 IEEE.  
Japanese Office Action issued Jan. 13, 2009 in corresponding Japanese Patent Application 2006-520482.

*Primary Examiner*—Jerry T Rahll  
(74) *Attorney, Agent, or Firm*—Staas & Halsey LLP

(57) ABSTRACT

An amount of change of a control signal applied to a polarization controller in a polarization mode dispersion compensator is determined for each feedback loop by evaluating degree of polarization response in past feedback loops.

13 Claims, 9 Drawing Sheets

POLARIZATION MODE DISPERSION COMPENSATOR AND POLARIZATION MODE DISPERSION COMPENSATING METHOD

TECHNICAL FIELD

The present invention relates to a compensation of polarization mode dispersion (PMD) for high bit-rate optical data transmission.

BACKGROUND ART

The reach of high bit-rate optical transmission systems becomes limited by PMD. The amount of PMD (expressed in terms of differential group delay (DGD) for the first order PMD) and also the orientation (expressed in terms of the principal states of polarization) fluctuate statistically with environmental changes like temperature. Therefore, a compensating device needs to be adaptive. Several solutions have been presented. As a general design, a polarization controller followed by a PMD compensating element is used.

FIG. 1 shows such a PMD compensator. The PMD compensator shown in FIG. 1 comprises polarization controller 101, DGD element 102 (fixed or variable), signal quality monitor 103, control logic 104, and interface 105. The signal quality monitor 103 provides feedback to the control logic 104. The control logic 104 adjusts the polarization controller 101 through interface 105 such that the PMD compensating element 102 applies inverse PMD to the transmission system. The interface 105 provides a reset-free, endless control to the polarization controller 101. As a feedback signal, any one of the bit-error rate, filtered spectral components, and the degree of polarization (DOP) can be used.

In FIG. 2, the dependence of the signal distortion, expressed in terms of Q-penalty, on the DGD (DGD) of a transmission fiber is shown. The signal distortion increases with the DGD of a transmission system. The higher the DGD is, the higher the signal distortion is. Also shown is the DOP as a function of the DGD of the transmission fiber. The DOP decreases with the DGD of a transmission system composed of a transmission fiber and a PMD compensator. The DOP reaches a maximum as the DGD of the transmission fiber approaches zero. Therefore, in one embodiment of a PMD compensator, the DOP can be used to adaptively control the feedback parameters on the polarization controller 101. The general control procedure is to adjust the feedback parameters such that the DOP reaches a maximum. In order to identify and reach the optimum compensation, some kind of dithering is required for adaptation. The control logic 104 dithers the control parameters applied on the polarization controller 101 and the DGD element 102 and optimizes the signal quality as measured by the monitor 103.

This procedure is outlined in FIG. 3. Changes are applied to the control parameters and the system response is measured. Depending on whether the signal quality has improved or not, changes are further applied in the same direction or the opposite direction, respectively. Performing this procedure over and over again, the PMD compensator tracks the optimum compensation point. The control parameters applied on the polarization controller 101 are slightly changed (dithered) (step 301) and the response is measured by, for example, the DOP (step 302). Then, it is checked whether the DOP has become higher than the previous DOP (step 303). If the DOP has become higher, the control parameters are further changed in the same direction tracking changing PMD conditions of the transmission fiber (step 304). Otherwise, the control parameters are changed such that the polarization controller 101 is driven in the opposite direction (step 305). This procedure can be described also as a trial and error method. In step 301, the control parameters are slightly changed around the current state in order to test whether the optimum has drifted. The amount of change needs to be high enough to clearly identify the optimum control point from, in general, the noisy and resolution-limited control parameter. On the other hand, the amount of applied changes (dithering steps) must not exceed a level at which significant distortion is introduced. Consequently, the maximum amount of applicable changes for the dithering steps (step size) is determined by the tolerable distortion due to the dithering procedure.

A problem arises due to the fact that the amount of introduced distortion (required for testing the optimum control point in the trial and error method) depends not only on the amount of applied parameter changes but also on the angular distance between the input polarization and the eigenaxis of the polarization controller. This is further explained using a Poincaré-sphere shown in FIG. 4. A state of polarization is described by two variables (angles), the azimuth $\theta$ and the ellipticity $\epsilon$ on the Poincaré-sphere. Here, a polarization controller composed of one or multiple sections of birefringent elements with adjustable retardance but fixed eigenaxis (eigenstate) 401 is assumed. Such a birefringent element can transform an input polarization into output polarizations located on a circle around the eigenaxis 401 of the birefringent element. Thus, the transformed polarization always describes a circle when the control parameters are changed. The radius of this circle depends on the angular distance between the input polarization and the eigenaxis 401. For the same applied changes in the feedback parameters, the amount of introduced signal distortion depends also on the angular distance between the input polarization and the eigenaxis 401 of the polarization controller. Therefore, the amount of polarization transformation and also the amount of introduced distortion becomes higher with increasing angular distance between the input polarization and the eigenaxis 401 for the same applied change of the control parameter.

Dithering the feedback parameters of the polarization controller with fixed step sizes is either too slow to track changing PMD conditions (small step size) or does not provide optimum compensation performance (large step size). This is illustrated in FIG. 5. In the case of too small step sizes (dithering steps), as indicated by (a), the PMD compensator is operational only as long as the PMD conditions of the transmission fiber do not change too fast. If the PMD conditions change, the PMD compensator is required to track these changes by varying the feedback parameters. Due to the limited amount of applicable parameter changes, the PMD of the transmission fiber may change faster than the PMD compensator is able to track when a fast disturbance arises. Thus, for too small step sizes, the PMD compensator will loose tracking in the case the PMD condition of the transmission fiber changes fast. In the case of too big dithering steps, as indicated by (b), the PMD compensator introduces from time to time high amounts of signal distortion incases of high angular distances between the input polarization and the eigenaxis of the polarization controller. Thus, the PMD compensator will be able to follow fast changes but the introduced Q-penalty required for dithering control will exceed a tolerable threshold.

This problem is known in the art through patent documents 1 and 2. There, the polarization controller comprises one or multiple sections of birefringent elements each with a fixed eigenstate of polarization but adjustable retardance. The amount of polarization change introduced by changing the control parameter applied on a birefringent element depends on the relative angle between the input polarization and the eigenstate of the birefringent element. At an extreme condition, the input polarization points into the direction of the eigenstate of the birefringent element. Then, by whatever amount the applied control parameter is changed, no change in polarization is introduced. The greater the angle between the input polarization and the eigenstate of the birefringent element is, the greater is the amount of polarization change for a given change of the control parameter. This is illustrated by FIG. 4. The possible polarization changes are located on, for example, circles 402 and 403 around the eigenstate 401. Depending on the distance of the input polarization from the eigenstate 401, the same change in the control parameter causes either a smaller polarization change (state S1->state S2) or a larger polarization change (state S3->state S4). The amount by which the overall polarization mode dispersion, and therefore the quality of data transmission measured e.g. by means of bit-error rate (BER), of an optical transmission system comprising a transmission fiber and a PMD compensator changes depends on the amount of introduced polarization change. The maximum amount of applicable parameter change for each feedback loop is therefore determined by the case for which the input polarization is at a maximum distance from the eigenstate of a birefringent element of the polarization controller. Otherwise an unacceptable amount of signal distortion would be introduced by the PMD compensator. On the other hand, the limited amount of applicable parameter change leads to little or even no change of the systems (transmission fiber plus PMD compensator) polarization mode dispersion in cases the input polarization is close to the eigenstate of a birefringent element. Under such circumstances tracking varying PMD conditions of the transmission fiber is difficult or even impossible. A method to overcome this is known in the art through the patent documents 1 and 2. Therein, the distance between the eigenstate of a birefringent element of a polarization controller and the input polarization is evaluated to adaptively change the amount of parameter change. For small distances a high amount of parameter change is applied at each feedback loop, while at large distances a small amount of parameter change is applied at each feedback loop. As indicated by (c) in FIG. 5, adaptive step size control allows for fast tracking of changing PMD conditions as well as the Q-penalty threshold is never exceeded.

This method, however, relies on the determination of the eigenstate of a birefringent element. The eigenstate can be estimated from the curvature between at least three polarizations measured at successive feedback loops. For example, the polarization state changes from state S1 to state S2 as shown in FIG. 4. The amount of polarization change is limited because otherwise an unacceptable amount of signal distortion would be introduced. Furthermore, the accuracy of polarization state measurements is limited by noise and other degrading effects. This makes the estimation of the eigenstate unreliable and the practical implementation difficult. Furthermore, time consuming calculations are required for curvature estimation, calculation of the eigenstate, and the computation of the angular distance to the actual state of polarization.

Another problem is that simple dithering (trial and error) involves a large amount of testing steps for a direction which decreases the amount of compensation and time is needed for correction. A third, general, problem is that there is no simple relation between the required polarization change and the amount of control parameter change. Sometimes large changes for the polarization controller applied voltages are necessary even if the required change in terms of polarization transformation is small. Therefore, with a simple dithering-like algorithm, only quasi-static compensation is possible. Such a PMD compensator will fail immediately for fast fluctuations due to fiber touching, etc.

Patent documents 3, 4, and 5 also describe PMD compensation in an optical transmission system.

Patent document 1 publication of European patent application, No. EP 1 170 890

Patent document 2 publication of Japan patent application, No. 2002-082311

Patent document 3 published Japanese translation of PCT international publication for patent application (WO98/29972), No. 2000-507430

Patent document 4 publication of Japan patent application, No. 2001-044937

Patent document 5 publication of Japan patent application, No. 2001-230728

DISCLOSURE OF INVENTION

It is an object of the present invention to provide a PMD compensator and a PMD compensating method which realize practical implementation of adaptive step size control. In particular, a fast method is described to adaptively optimize the step size with which the parameters applied on the polarization controller are changed for each feedback loop.

A polarization mode dispersion compensator according to the present invention comprises a polarization controller, a compensating device, a signal quality monitor, and a control unit. The polarization controller transforms polarization of an input optical signal and the compensating device compensates for a polarization mode dispersion of the input optical signal and outputs an output optical signal. The signal quality monitor measures quality of the output optical signal and generates a feedback signal indicating the measured quality. The control unit determines an amount of change of a control signal applied to the polarization controller for each feedback loop, by evaluating degree of polarization response to the control signal using a plurality of feedback signals generated in past feedback loops, changes the control signal by the determined amount, and applies a changed control signal to the polarization controller.

BEST MODE FOR CARRYING OUT THE INVENTION

Figure 1:
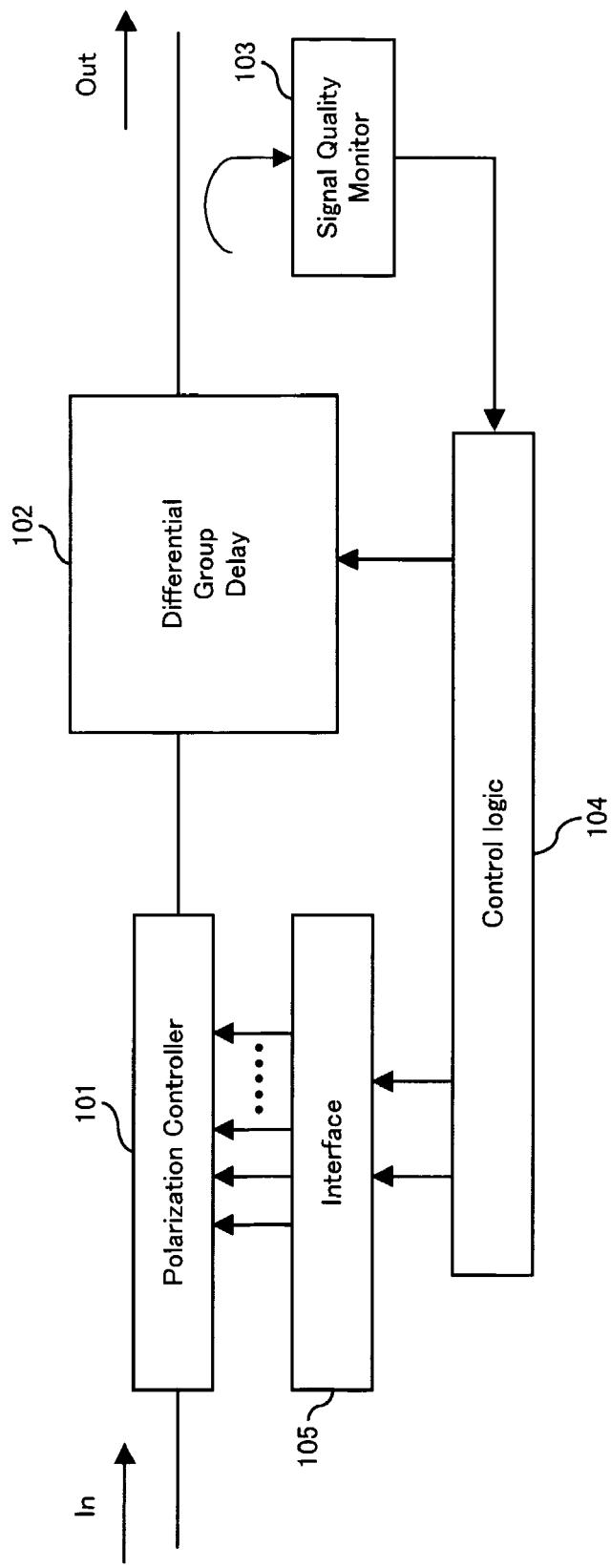
FIG. 1 shows a configuration of a conventional PMD compensator.
Figure 2:
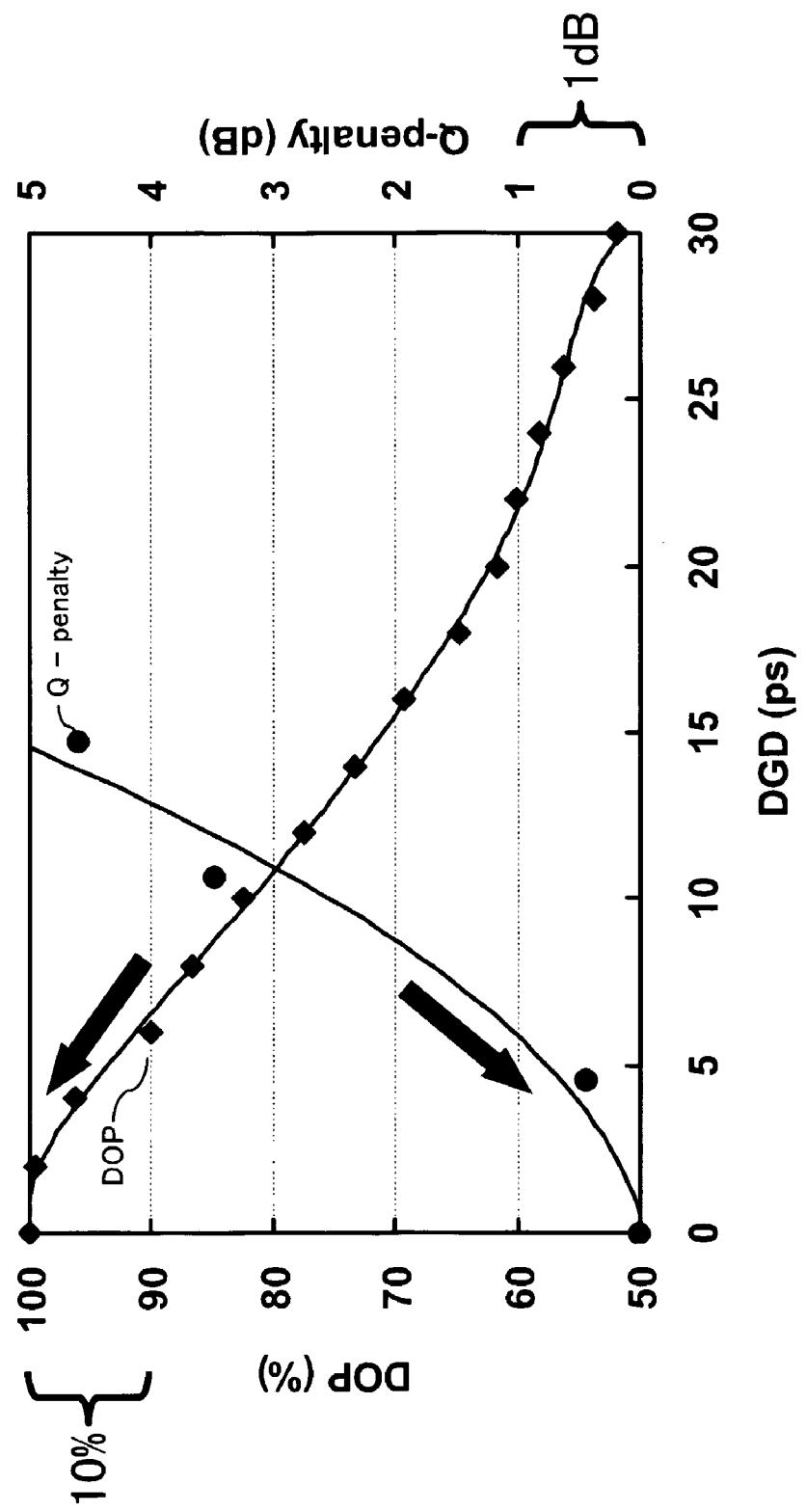
FIG. 2 shows Q-penalty and DOP as a function of DGD.
Figure 3:
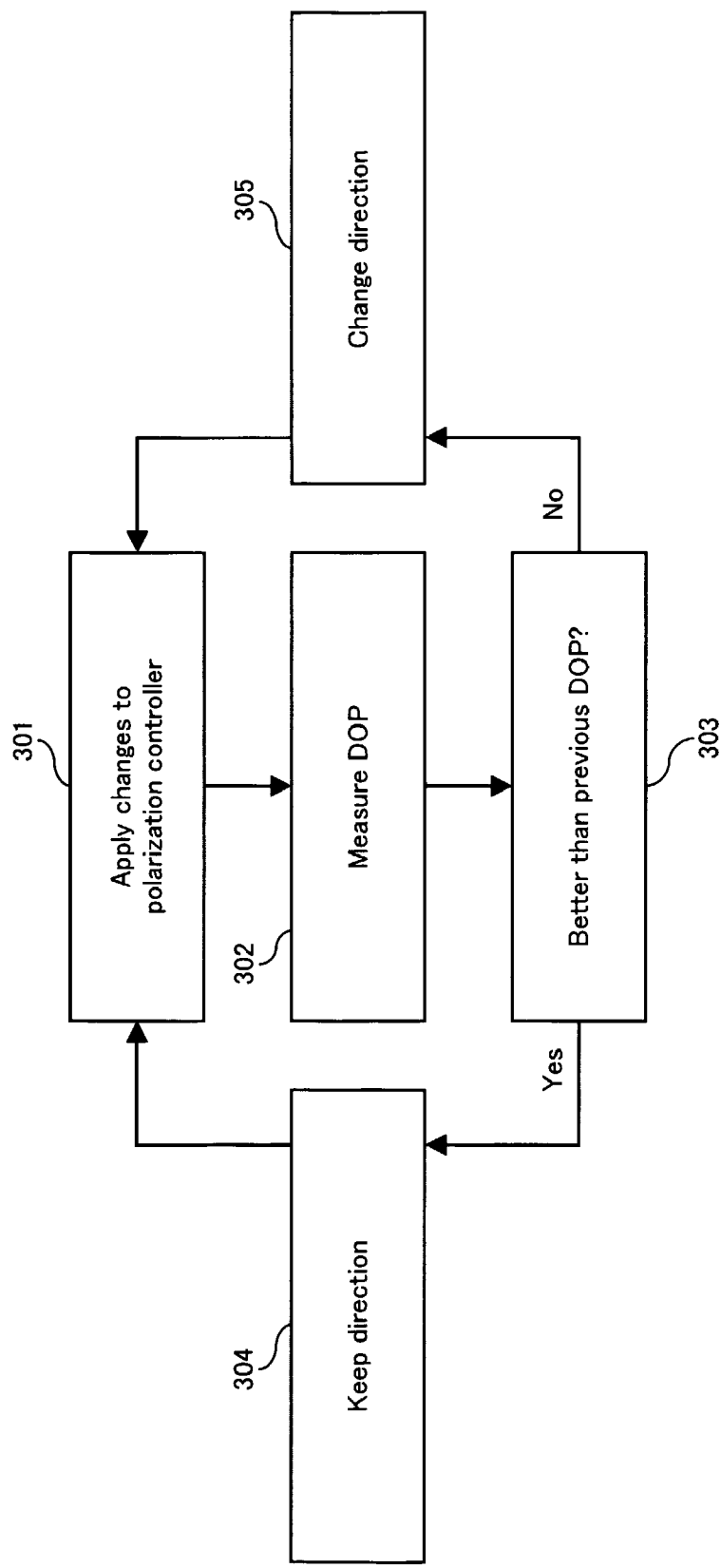
FIG. 3 shows outline of general control procedure for a PMD compensator.
Figure 4:
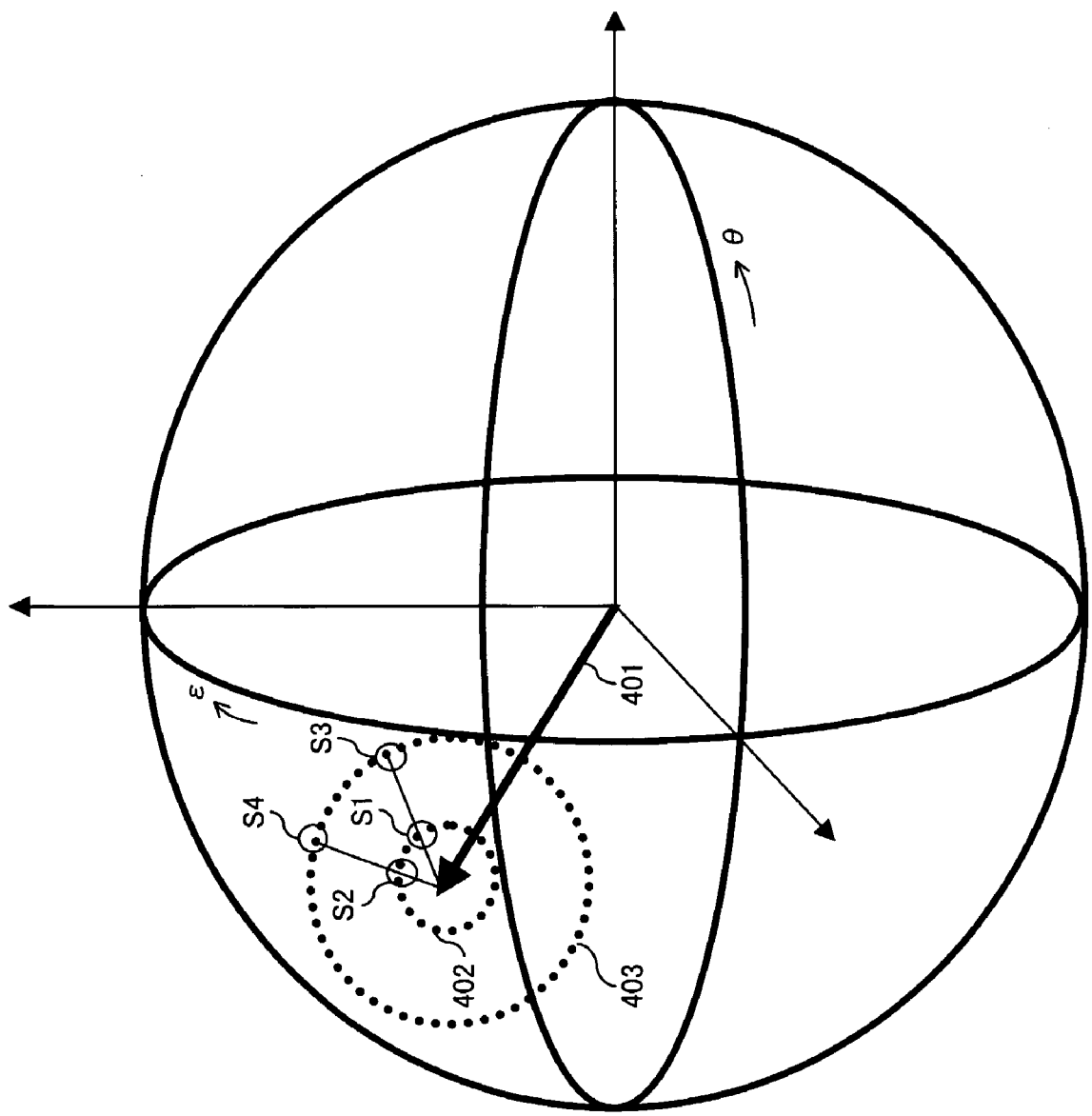
FIG. 4 shows polarization change on a Poincaré-sphere.
Figure 5:
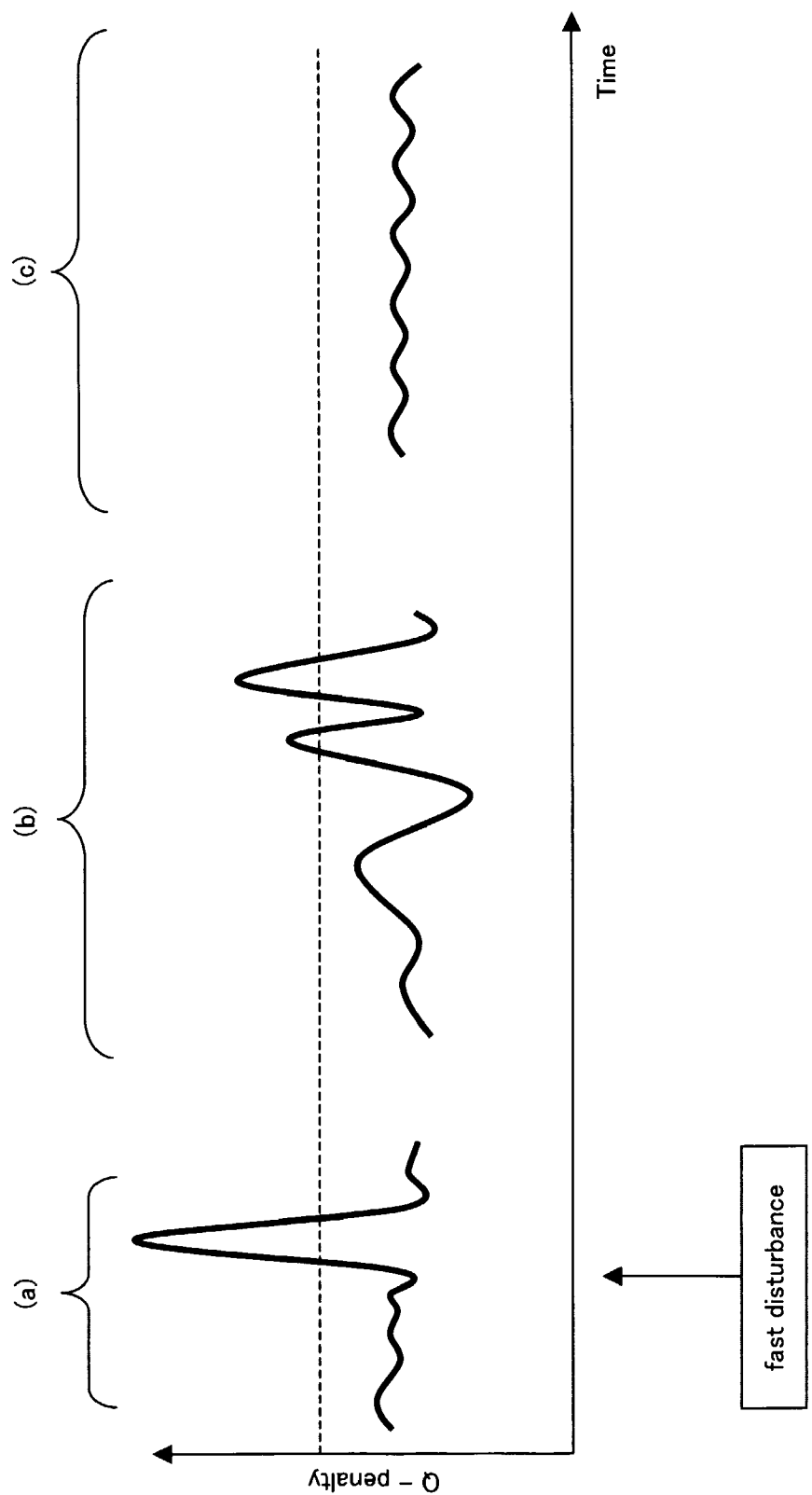
FIG. 5 shows impact of fixed step size control of a polarization controller in a PMD compensator.

Hereinafter, preferred embodiments according to the present invention will be described in detail by referring to the drawings.

In the embodiments, the past DOP variations (DOP history) caused by the applied control voltages to the polarization controller are evaluated. Depending on whether the past DOP variance is above or below a certain threshold, corresponding control parameters (which are to be applied in the next step) are decreased or increased. Applying this control method, too big steps which lead to decreased compensation performance as well as too small steps which lead to dangerously reduced response time are effectively avoided. In order to further enhance the response time (tracking capability in cases of fast PMD fluctuation due to e.g. fiber touching), the control method includes the monitoring of control steps leading to wrong directions, i.e. directions causing a decrease of PMD compensation instead of an improved compensation. By this method, the number of steps required to search for the optimum compensator state is reduced by avoiding directions that have caused a decrease of compensation in the past.

Figure 6:
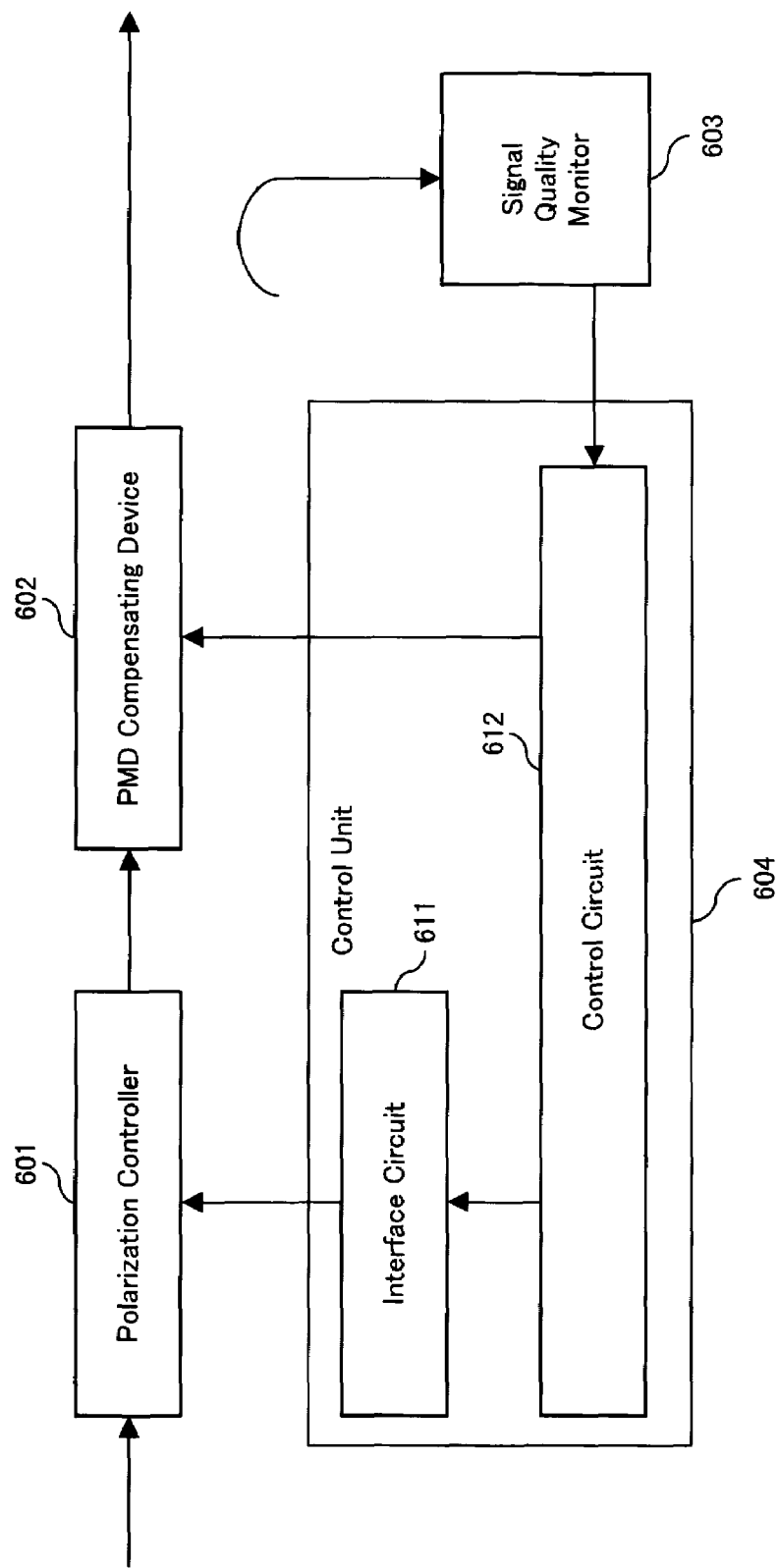
FIG. 6 shows a configuration of a PMD compensator according to the present invention.

FIG. 6 shows a configuration of a PMD compensator employing such a control method. The PMD compensator comprises polarization controller 601, PMD compensating device 602, signal quality monitor 603, and control unit 604. The control unit 604 includes interface circuit 611 and control circuit 612. The signal quality monitor 603 measures the state and DOP of the light output from the PMD compensating device 602 to provide a feedback signal to the control circuit 612. The control circuit 612 generates control signals for the polarization controller 601 and the PMD compensating device 602 using the feedback signal and provides one of them to the polarization controller 601 through the interface circuit 611 and the other to the PMD compensating device 602.

The polarization controller 601 includes birefringent elements controllable like a concatenation of one or more rotatable waveplates. Each waveplate may have a fixed amount of retardance or an amount of retardance may be adjustable. The PMD compensating device 602 is an optical element with a fixed amount of DGD or with a variable and adjustable amount of DGD. In the following, it is assumed that the polarization controller 601 comprises multiple (four for example) sections of independently-controllable fractional waveplates and is followed by a variable DGD element. To those who are skilled in the art, it is known that various realizations are possible. For example, the polarization controller could be mechanically rotatable waveplates, a lithium niobate (LiNbO$_3$) device, or concatenated optical elements with variable retardance but fixed eigenaxis like liquid-crystal cells, fiber squeezers, or electro-optical materials like lead lanthanum zirconate titanate (PLZT), which can act like rotatable fractional waveplates when assembled with appropriate angular alignment.

Figure 7:
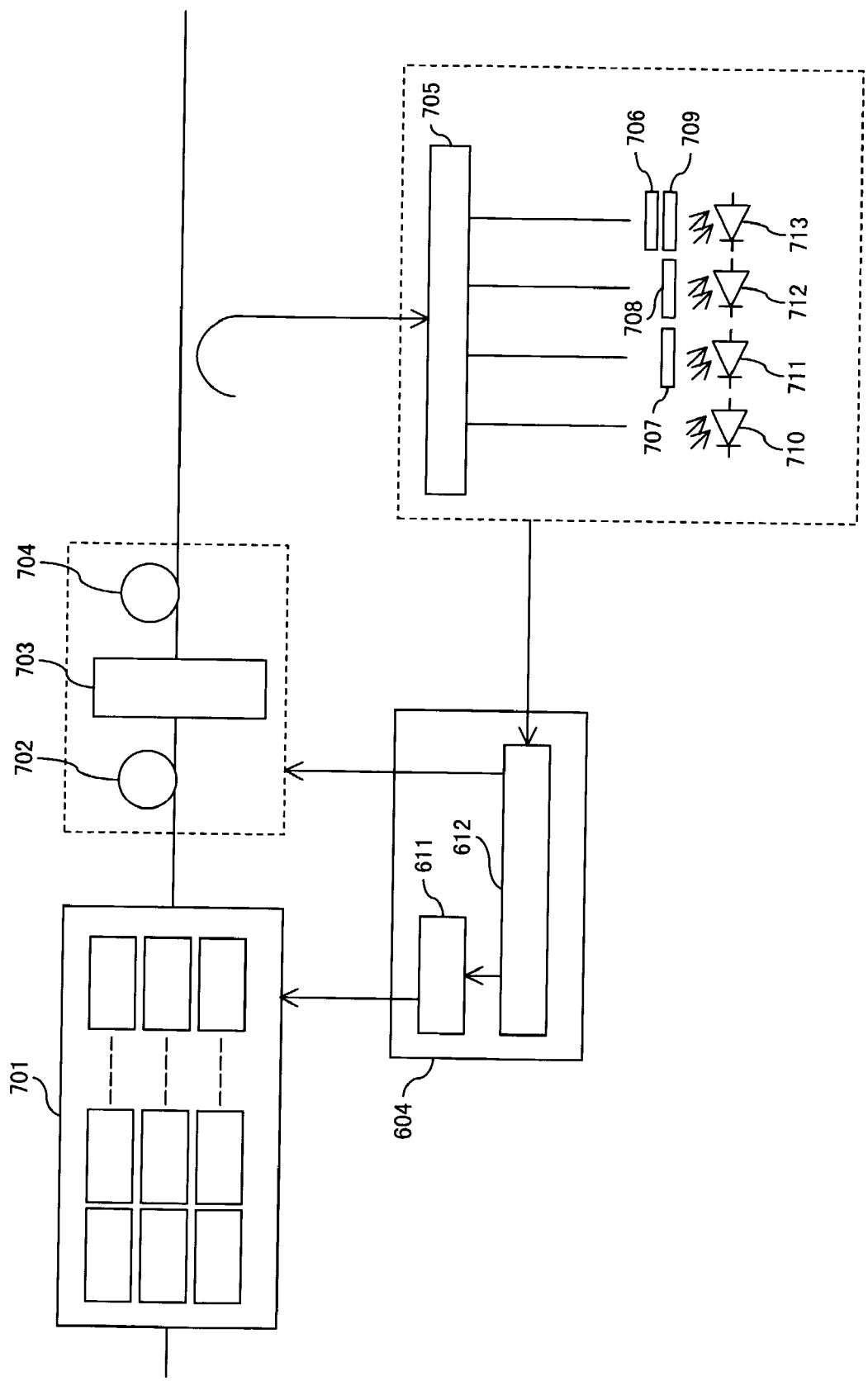
FIG. 7 shows a concrete example of a configuration of a PMD compensator.

FIG. 7 shows a concrete example of the configuration of the PMD compensator shown in FIG. 6. The PMD compensator comprises polarization controller 701, polarization maintaining fibers 702 (0°) and 704 (90°), variable retarder 703 (45°), beam splitter 705, retarder 706 (λ/4), polarizers 707 (0°), 708 (45°), and 709 (0°), and photodiodes 710 through 713, and the control unit 604. The polarization controller 701 corresponds to a LiNbO$_3$ realization of the polarization controller 601 in FIG. 6. The polarization maintaining fibers 702 and 704 and variable retarder 703 corresponds to the PMD compensating device 602 in FIG. 6. The beam splitter 705, retarder 706, polarizers 707 through 709, and photodiodes 710 through 713 form a Stokes polarimeter which corresponds to the signal quality monitor 603 in FIG. 6. In a Stokes polarimeter, an incoming light beam is split into at least four beams, each beam passes through a polarizer (and a retarder) and the resulting intensities are measured. The Stokes vector is calculated by a linear combination of the four or more measured intensities.

The polarization controller 701 is realized by multiple three-electrode sections on a LiNbO$_3$ substrate. The whole structure operates like multiple rotatable waveplates. The control circuit 612 provides control signals indicating rotation angles for the multiple sections to the interface circuit 611. The interface circuit 611 converts the rotation angles into control voltages and applies the voltages to electrodes of the polarization controller 701. The PMD compensating device comprises two sections of DGD elements 702 and 704 separated by a variable retarder 703 and the eigenaxis of the variable retarder 703 is oriented at 45° with respect to the eigenaxis of each DGD element. More generally, the PMD compensating device may comprise multiple sections of DGD elements separated by individually controllable variable retarders with the eigenaxis oriented at 45° with respect to the eigenaxis of each of two adjacent DGD elements. Denoting the intensities detected by the photodiodes 710, 711, 712, and 713 as $I_0$, $I_1$, $I_2$, and $I_3$, respectively, the Stokes-vector $\vec{S}$ can be obtained by the following equations.

$$\vec{I} = \begin{pmatrix} I_0 \\ I_1 \\ I_2 \\ I_3 \end{pmatrix}$$

$$\vec{S} = E \cdot \vec{I}$$

E: unit matrix

Describing the state of polarization in terms of the Stokes-vector $\vec{S}$ $$\vec{S} = \begin{pmatrix} S_0 \\ S_1 \\ S_2 \\ S_3 \end{pmatrix},$$

the DOP is calculated as the quotient of the polarized light power and the total power:

$$DOP = \frac{\sqrt{S_1^2 + S_2^2 + S_3^2}}{S_0}.$$

The control circuit 612 determines the control signals for the polarization controller 701 and the PMD compensating device using the feedback information with respect to the Stokes-vector $\vec{S}$. Each of the control circuit 612 and the interface circuit 611 is configured by, for example, a digital signal processor (DSP).

Figure 8:
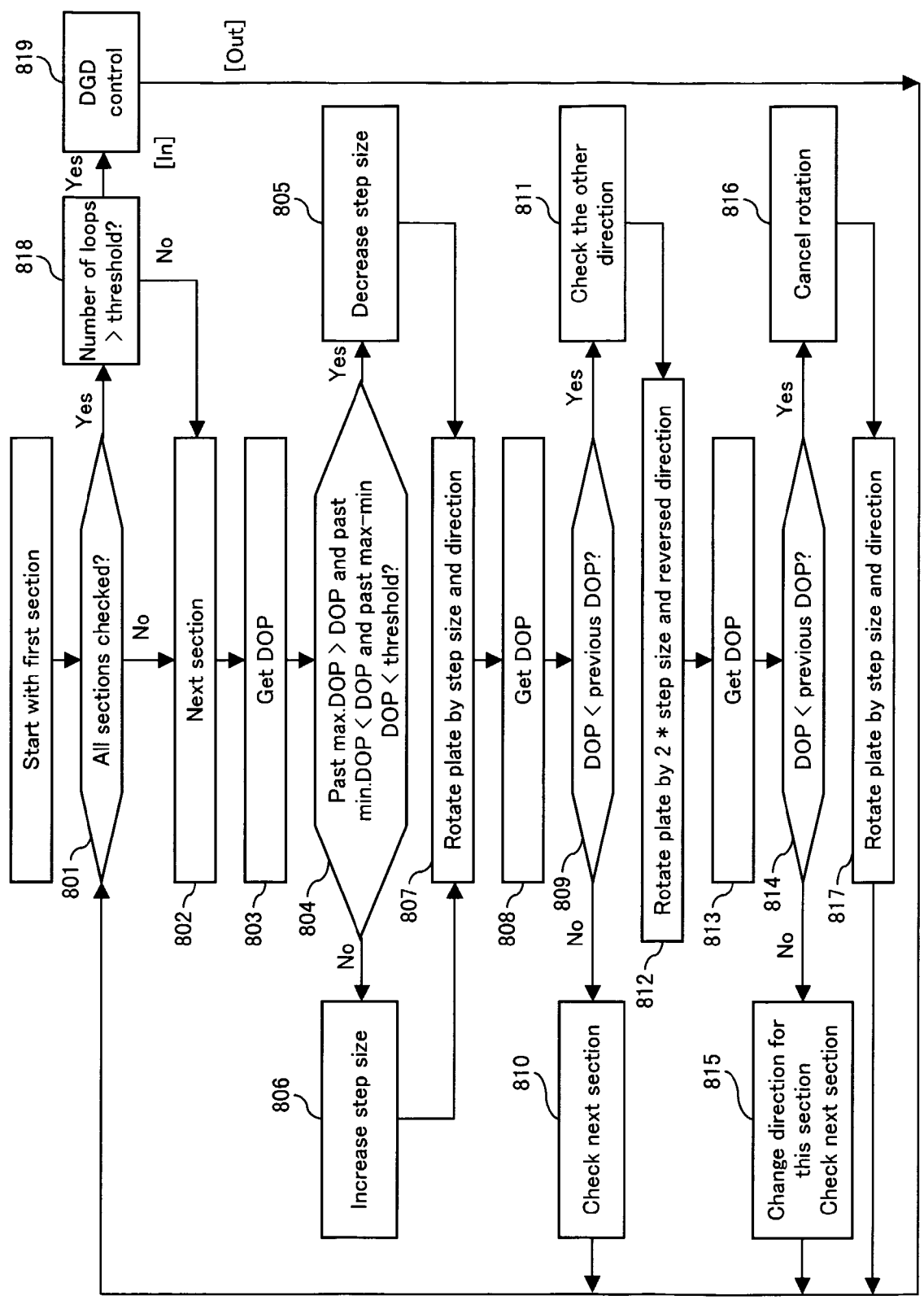
FIG. 8 shows a flowchart of a control algorithm to adaptively control the step size of a polarization controller.
Figure 9:
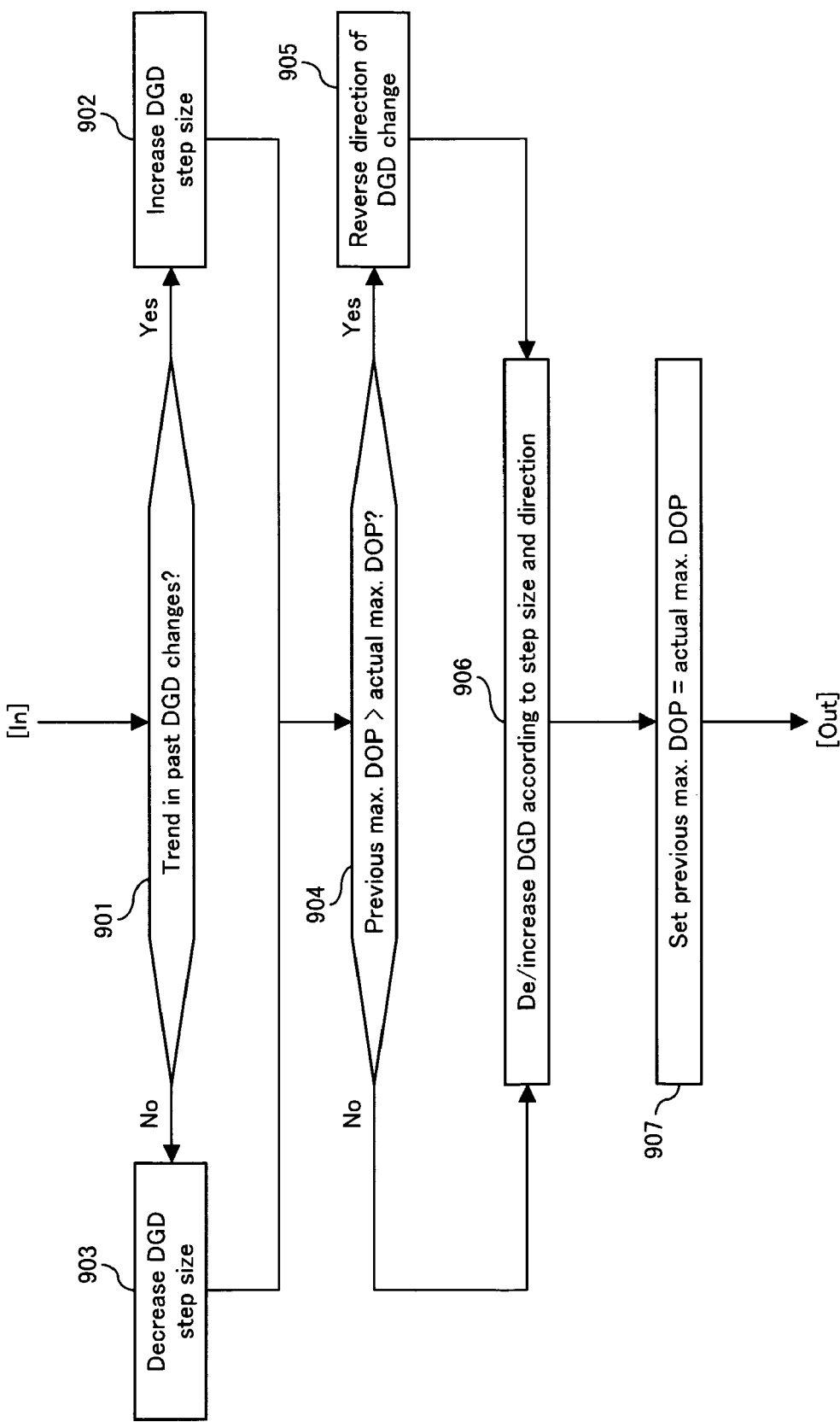
FIG. 9 shows a flowchart of a control algorithm to adaptively control the step size of a PMD compensating device.

An example of the control algorithm of the control circuit 612 is outlined in the flowchart shown in FIGS. 8 and 9. FIGS. 8 and 9 show control algorithms of step size adaptation for the polarization controller and the PMD compensating device, respectively. The algorithm starts with the first waveplate section of the polarization controller (step 802) and the DOP is measured (step 803). For step size adaptation, this measured DOP is compared with previously measured DOP values. Only the most recent DOP values (e.g. 20 times of measurement or so) are taken into account.

Next, It is checked whether the PMD conditions are stable or not (step 804). If the newly measured DOP value is neither smaller nor greater than one of the previous DOP values and furthermore the difference between the maximum and minimum previous DOP values is below a certain threshold, the PMD conditions are stable. Accordingly, the measured DOP value is compared with the maximum (past max. DOP) and minimum (past min. DOP) of the previous DOP values, respectively, and the difference between the maximum and minimum is compared with a threshold value. If the measured DOP value is smaller than past max. DOP and greater than past min. DOP and if the difference is smaller than the threshold value, the PMD condition is judged to be stable and the step size of the control signal for the section is decreased (step 805). Otherwise the PMD condition is judged to be unstable and the step size is increased to account for the possibility of fast varying PMD conditions (step 806). Then, the waveplate of this section is rotated by the changed step size in a prescribed direction (step 807) and the response is measured by means of DOP (step 808).

Next, the measured DOP value is compared with the previously measured one before rotation (step 809). If this DOP value is greater than or equal to the previous one, compensation is improved and the algorithm starts with the next waveplate section (step 810). In the case the newly measured DOP value is smaller than the previous one, compensation is worse (step 811) and the waveplate is rotated back by twice the step size in the reverse direction (step 812). Then, the DOP is measured again (step 813) and the measured DOP value is compared with the previously measured one (step 814). If it is greater than or equal to the previous one, compensation is improved. The rotation direction for this waveplate section is marked to be changed for the next control loop and the algorithm proceeds to the next waveplate section (step 815). Thus, control steps for the direction in which compensation is worse are effectively skipped in the succeeding control loops for this section. In the case the newly measured DOP is smaller than the previous one, compensation got worse (step 816). Then, the waveplate is rotated back to the initial condition (step 817) and the algorithm proceeds with the next waveplate section. Every time the DOP is measured in steps 803, 808, and 813, the measured DOP value is compared with the actual maximum of the DOP values measured before (actual max. DOP). If this value is greater than actual max. DOP, actual max. DOP is updated by recording the measured value as actual max. DOP.

Next, it is checked whether all the waveplate sections are evaluated according to the above described procedure or not (step 801). If not, the next waveplate section is evaluated in step 802 and below. If all the waveplate sections are evaluated in a control loop, the number of control loops performed is compared with a threshold value (step 818). If the number of control loops is smaller than or equal to the threshold value, the loop starts again with the first waveplate section in step 802 and below. In the case the number exceeds the threshold value, DGD control for the PMD compensating device will start (step 819).

In the case a variable DGD element is implemented in the PMD compensating device after the polarization controller, the DGD control algorithm in step 819 is as shown in FIG. 9. The polarization fluctuations of a realistic optical transmission fiber are faster than the DGD variations. Therefore, the algorithm for controlling and optimizing the DGD element is called after several feedback loops for the polarization controller have been performed. At first, it is checked whether there is a specific trend in the past DGD changes, i.e. whether the DGD continuously decreased or increased (step 901). This reflects the DGD variation of the transmission span. A continuous decrease or increase of past DGD settings of the PMD compensator would consequently indicate changing DGD conditions of the transmission fiber. To account for this, in the case the DGD shows a specific trend, the step size by which the DGD of the PMD compensating device will be changed is increased to enhance responsiveness (step 902). On the other hand, in the case the DGD shows no specific trend, the DGD condition of the transmission fiber is constant and there is no need to heavily change the DGD. Small changes are sufficient in order to detect future DGD variation of the transmission fiber. Thus, the step size for the PMD compensating device is decreased (step 903).

Next, actual max. DOP as recorded in the control loop for the polarization controller is compared with the previous maximum of the DOP values (previous max. DOP) as recorded in step 907 at the end of the previous DGD control loop (step 904). If actual max. DOP is smaller than previous max. DOP, the compensation performance has become worse for the previous DGD setting. Therefore, the direction of the DGD change is reversed (step 905). In the case compensation performance has been improved, i.e. actual max. DOP is greater than or equal to previous max. DOP, the direction is kept the same. Next, the DGD element in the PMD compensating device is set according to the changed step size and the determined direction (step 906) and actual max. DOP is recorded as previous max. DOP for the succeeding DGD control loop (step 907). Then, the algorithm proceeds to the subsequent control loops for the polarization controller (step 801 and below in FIG. 8).

As described in detail above, according to the present invention, determination of the eigenstate of a birefringent element in the PMD conmensating device is not required but rather simple evaluation of the past DOP values is employed for controlling a PMD compensator. Therefore, practical implementation of adaptive step size control which can track the fast varying PMD conditions is realized.

The invention claimed is:

1. A polarization mode dispersion compensator comprising:
   a polarization controller rotating a polarization angle of an input optical signal and outputting polarization controlled light;
   a polarization mode dispersion (PMD) compensating device compensating a polarization mode dispersion of the polarization controlled light and outputting a PMD compensated light;
   a signal quality monitor measuring a degree of polarization (DOP) of the PMD compensated light and generating a feedback signal indicating the measured DOP of the PMD compensated light; and
   a control unit controlling the polarization controller and PMD compensating device based on the measured DOP, wherein the control unit determines an amount of change of a control signal applied to the polarization controller for a feedback loop, by evaluating a DOP in response to the control signal using a plurality of feedback signals generated in the past feedback loops, changes the control signal by the determined amount, applies a changed control signal to the polarization controller, the compensating device is an optical element with a variable and adjustable amount of differential group delay, and the control unit determines an amount of change of the differential group delay for each feedback loop by evaluating a past trend of changes of the differential group delay of the compensating device.

2. The polarization mode dispersion compensator according to claim 1, wherein the control unit obtains degree of polarization from each of the plurality of feedback signals, compares a difference between a maximum and a minimum of the obtained degree of polarization with a threshold value, and increases the amount of change when the difference is greater than the threshold value.

3. The polarization mode dispersion compensator according to claim 2, wherein the control unit obtains degree of polarization from a current feedback signal, compares the obtained degree of polarization with the maximum and the minimum of degree of polarization, and decreases the amount of change when the obtained degree of polarization is smaller than the maximum and greater than the minimum and the difference is smaller than the threshold value.

4. The polarization mode dispersion compensator according to claim 1, 2, or 3, wherein the control unit marks change of the control signal leading to a worse compensation performance and skips a control step with the marked change in one or more of succeeding feedback loops.

5. The polarization mode dispersion compensator according to claim 1, 2, or 3, wherein the polarization controller includes birefringent elements controllable as a concatenation of one or more rotatable waveplates each of which is with a fixed amount of retardance.

6. The polarization mode dispersion compensator according to claim 5, wherein the birefringent elements are realized by multiple three-electrode sections on a LiNbO$_3$ substrate, each of which operates as a rotatable waveplate controlled by voltages applied to electrodes.

7. The polarization mode dispersion compensator according to claim 1, 2, or 3, wherein the polarization controller includes birefringent elements controllable as a concatenation of one or more rotatable waveplates whereby an amount of retardance is adjustable.

8. The polarization mode dispersion compensator according to claim 1, 2, or 3, wherein:

the polarization controller includes birefringent elements controllable as a concatenation of one or more rotatable waveplates; and the control unit marks a rotation direction of one of the waveplates leading to a worse compensation performance and skips a control step with change of a control signal for the marked direction in one or more of succeeding feedback loops.

9. The polarization mode dispersion compensator according to claim 1, wherein the control unit checks whether the differential group delay shows one of a continuous decrease and increase, and increases the amount of change of the differential group delay when the differential group delay shows the one of the continuous decrease and increase.

10. The polarization mode dispersion compensator according to claim 1, 2, or 3, wherein:

the signal quality monitor includes a polarimeter which measures components of a Stokes vector and generates a feedback signal indicating the components of the Stokes vector; and the control unit obtains degree of polarization using the components of the Stokes vector.

11. A polarization mode dispersion compensating method comprising:

rotating a polarization angle of an input optical signal and outputting polarization controlled light through a polarization controller;

compensating a polarization mode dispersion of the polarization controlled light and outputting a polarization mode dispersion (PMD) compensated light through a PMD compensating device;

measuring a degree of polarization (DOP) of the PMD compensated light and generating a feedback signal indicating the measured DOP of the PMD compensated light; and controlling the polarization controller and PMD compensating device based on the measured DOP, wherein the controlling determines an amount of change of a control signal applied to the polarization controller for a feedback loop, by evaluating a DOP in response to the control signal using a plurality of feedback signals generated in past feedback loops, changes the control signal by the determined amount, and applies a changed control signal to the polarization controller, wherein the controlling compares a difference between a maximum and a minimum of the degree of polarization obtained from the respective feedback signals, with a threshold value, and increases the amount of change when the difference is greater than the threshold value.

12. The polarization mode dispersion compensating method according to claim 11, wherein the controlling obtains the degree of polarization from a current feedback signal, compares the obtained degree of polarization with the maximum and the minimum of degree of polarization, and decreases the amount of change when the obtained degree of polarization is smaller than the maximum and greater than the minimum and the difference is smaller than the threshold value.

13. The polarization mode dispersion compensating method according to claim 11, or 12, further comprising:

marking change of the control signal leading to a worse compensation performance; and skipping a control step with the marked change in one or more of succeeding feedback loops.

* * * * *

UNITED STATES PATENT AND TRADEMARK OFFICE
CERTIFICATE OF CORRECTION

| | |
|---|---|
| PATENT NO. | : 7,613,366 B2 |
| APPLICATION NO. | : 10/581853 |
| DATED | : November 3, 2009 |
| INVENTOR(S) | : Jens C. Rasmussen et al. |

Page 1 of 1

It is certified that error appears in the above-identified patent and that said Letters Patent is hereby corrected as shown below:

Column 9, Line 13, change "obtains degree" to --obtains the degree--.

Column 9, Line 21, change "obtains degree" to --obtains the degree--.

Column 10, Line 13, change "obtains degree" to --obtains the degree--.

Column 10, Line 46, change "of degree" to --of the degree--.

Column 10, Line 52, change "11," to --11--.

Signed and Sealed this

Nineteenth Day of January, 2010

David J. Kappos
*Director of the United States Patent and Trademark Office*